May 21, 1963  A. B. KEHLET ET AL  3,090,580
SPACE AND ATMOSPHERIC RE-ENTRY VEHICLE
Filed April 13, 1962  3 Sheets-Sheet 1

INVENTORS
ALAN B. KEHLET
DENNIS F. HASSON
WILLIAM W. PETYNIA

BY
ATTORNEYS

May 21, 1963     A. B. KEHLET ET AL     3,090,580
SPACE AND ATMOSPHERIC RE-ENTRY VEHICLE
Filed April 13, 1962     3 Sheets-Sheet 2

INVENTORS
ALAN B. KEHLET
DENNIS F. HASSON
WILLIAM W. PETYNIA

BY

ATTORNEYS

May 21, 1963 A. B. KEHLET ET AL 3,090,580
SPACE AND ATMOSPHERIC RE-ENTRY VEHICLE
Filed April 13, 1962 3 Sheets-Sheet 3
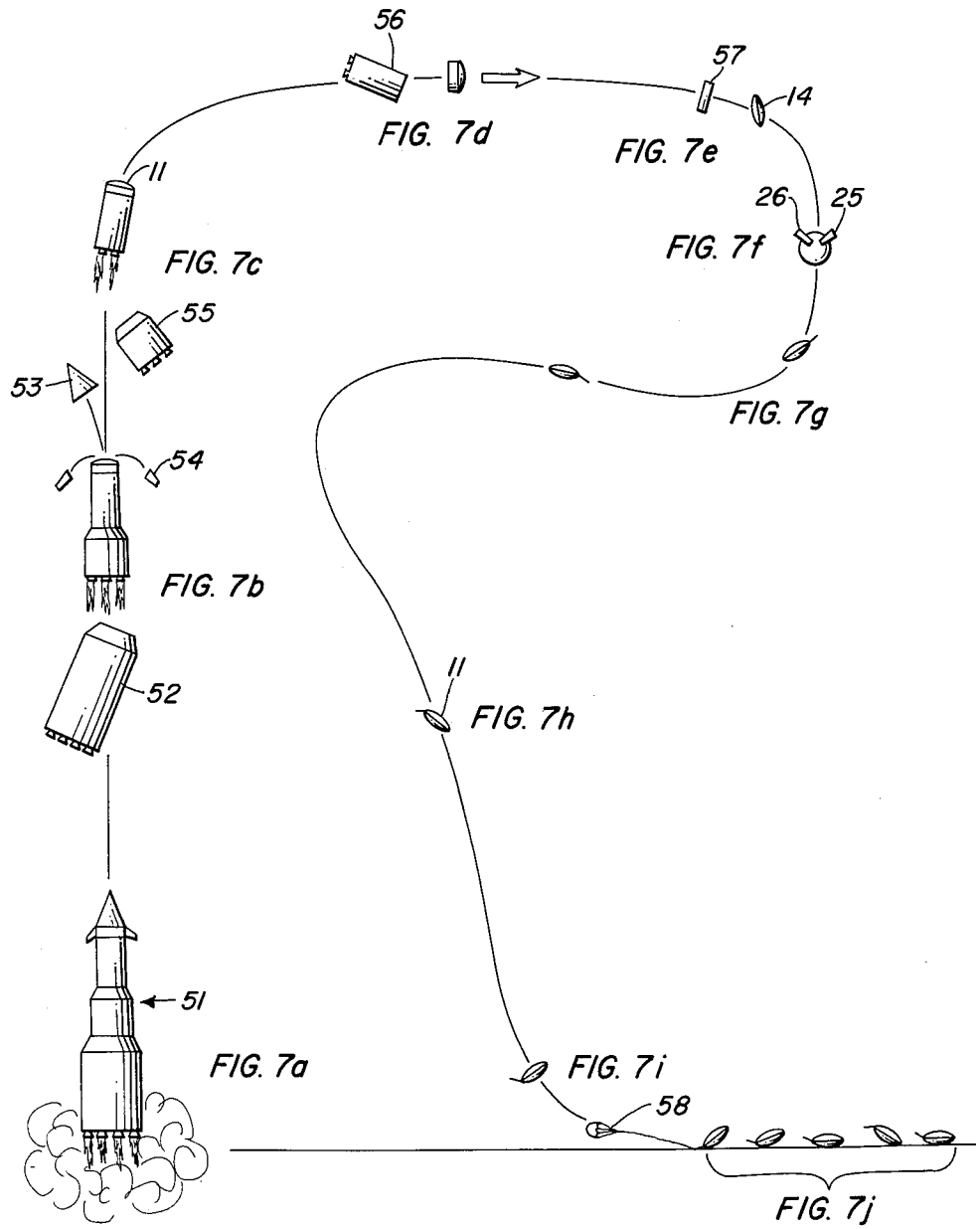
INVENTORS
ALAN B. KEHLET
DENNIS F. HASSON
WILLIAM W. PETYNIA
BY
ATTORNEYS

United States Patent Office 3,090,580
Patented May 21, 1963

3,090,580
SPACE AND ATMOSPHERIC RE-ENTRY VEHICLE
Alan B. Kehlet, Newport News, Va., Dennis F. Hasson, Silver Spring, Md., and William W. Petynia, Houston, Tex., assignors to the United States of America as represented by the Administrator of the National Aeronautics and Space Administration
Filed Apr. 13, 1962, Ser. No. 187,446
14 Claims. (Cl. 244—1)
(Granted under Title 35, U.S. Code (1952), sec. 266)

The invention described herein may be manufactured and used by or for the Government of the United States of the United States of America for governmental purposes without the payment of any royalties thereon or therefor.

This invention relates generally to space vehicles, and more particularly to manned reentry vehicles for operation both above and within the Earth's atmosphere.

A vehicle capable of performing manned orbital and space missions, and possessing the additional capability of atmospheric maneuverability, such as is generally attributed to fixed wing aircraft, is not presently available in the field of space technology. A vehicle of the type described need necessarily incorporate a plurality of diverse features to provide performance as desired under the different environmental conditions to which it will be exposed. The space vehicle may be normally launched into space as the final stage of a booster-vehicle system and therefore should initially be of such shape as to minimize the launch or boost vehicle's control and structural loading problems. The space vehicle must have an attitude stabilization system for employment while in flight outside the Earth's atmosphere. The vehicle must be capable of surviving the heat generated during its subsequent reentry into the Earth's atmosphere and of shielding its occupants therefrom. Further, the vehicle must then have an atmospheric maneuvering capability of a degree such as to enable the occupants to control the rate of deceleration, to select a desired landing area for the vehicle and to perform a glide type landing thereon. From the viewpoint of operation sequence reliability and selection of landing area, a flared or glide type landing capability is considered preferable to landing space vehicles by parachute in accordance with prior art methods.

Winged vehicles and vehicles with body asymmetry have been proposed as reentry vehicles capable of atmospheric maneuvering and glide type landings. However, for a fixed maximum total vehicle weight requirement with which to accomplish a given mission, both the winged and the asymmetric vehicles present two major problems, the solution of which would result in the reduction of usable payload; the problem of providing thermal shielding over a much larger vehicle surface area, and a booster-vehicle attachment problem which can be solved only through the use of a heavy booster-vehicle adapter.

Accordingly, it is an object of the present invention to provide a novel space vehicle for orbital flight.

Another object is to provide a space vehicle capable of being attitude stabilized outside of the Earth's atmosphere and of being maneuvered subsequent to reentry into the Earth's atmosphere.

A further object of the present invention is to provide a symmetrical space vehicle capable of performing glide type landings.

A still further object of the instant invention is to provide a space vehicle having glide type water landing capabilities.

According to the present invention, the foregoing and other significant objects are attained by the provision of a lenticular vehicle having foldable aerodynamic control flaps pivotally mounted on the upper convex vehicle surface. The control flaps are adapted to form a substantially continuous extension of the upper convex vehicle surface when in folded or retracted position during the launch and orbital stages of a vehicle mission, and to be deployed into an operative, extended position upon reentry of the vehicle into the Earth's atmosphere. The space vehicle further includes individually actuated reaction jets, positioned on the vehicle's upper convex surface, for attitude control while outside of the Earth's atmosphere. In a further aspect of the instant invention, the vehicle is provided with an extendible nose ski for landing on water.

A more complete appreciation of the invention and many of the attendant advantages thereof will be readily apparent as the same becomes better understood by reference to the following detailed description when considered in connection with the accompanying drawings wherein:

FIGS. 7a–7j illustrate the sequence of events that take place in the launching, space flight, reentry, and landing of the space vehicle of the present invention.

Figure 1:
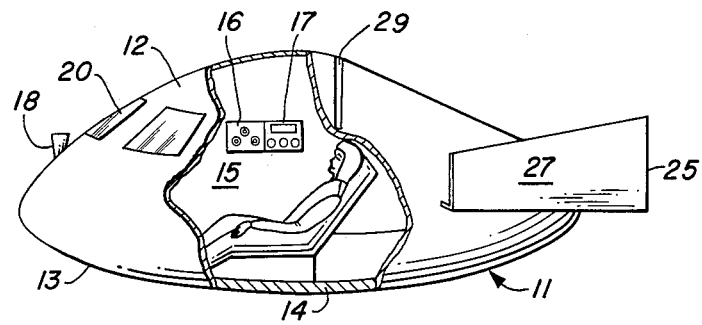
FIG. 1 is a side elevational view, partly broken away, of the space vehicle of the present invention with the flaps in operative, extended position.
Figure 2:
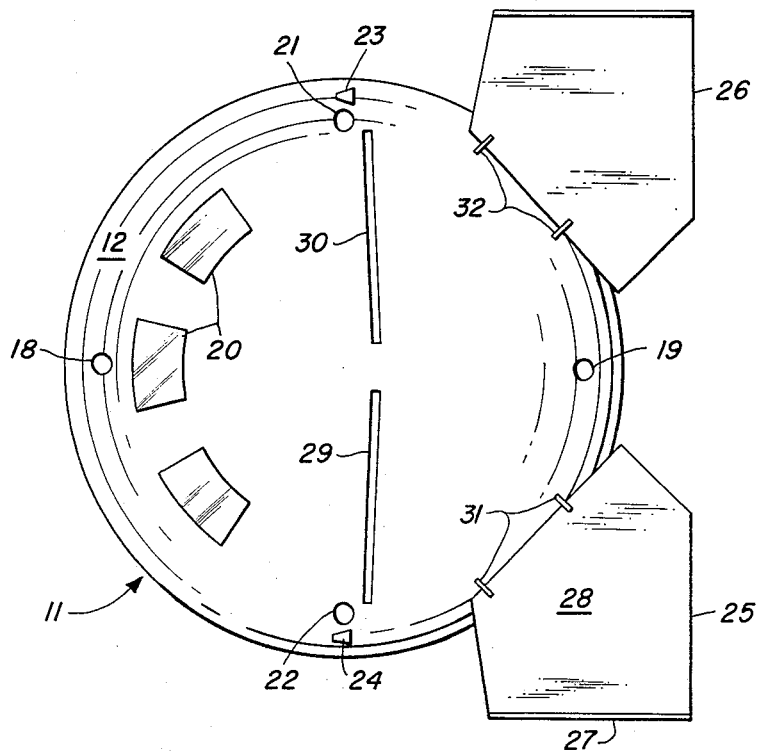
FIG. 2 is a planform view of the space vehicle of FIG. 1.

Referring now to the drawings wherein like reference numerals designate identical or corresponding parts throughout the several views, and more particularly to FIGS. 1 and 2, the space vehicle according to the present invention, generally indicated by the reference numeral 11, is shown. Space vehicle 11 includes a body of revolution having a circular planform and a double convex lens-like cross section. The lenticular body of space vehicle 11 includes an upper convex surface 12 and a lower convex surface 13; the lower convex surface being formed by a relatively thick, curved heat shield 14. One type of heat shield having the inherent strength suitable for use is disclosed in the copending in the copending application of Roger A. Anderson et al., Serial No. 141,220, filed September 27, 1961. The employment of such a shield as the surface 13 of vehicle 11 serves two important functions. The shield 14 protects the vehicle 11 and its occupants from the heat generated during the vehicle's reentry into the Earth's atmosphere, and also acts as a "skid-rocker" for the vehicle, as will be discussed more fully hereinafter. The use of heat shield 14 enables the vehicle to land on hard surfaces without developing high impact loads, thereby obviating the need for providing additional, heavy, complicated landing gear. Observation windows 20 are provided in the forward sector of the vehicle 11.

The advantages derived from utilizing a lenticular shaped body for a space craft are many fold. Some of these advantages may be briefly summarized as follows: The lenticular vehicle has a higher usable volume to surface area ratio than a winged vehicle and requires less thermal protection and shielded area than such a vehicle. Also the lenticular vehicle, because of its short afterbody in a high angle of attack attitude, i.e., volume to the rear of heat shield maximum diameter, will have less severe afterbody heating problems than the afterbody of a blunt nose-cone semi-lifting capsule or craft. Therefore, the structural weight to total weight of the lenticular vehicle is less than either the winged or the semi-lifting capsule configuration. The lenticular vehicle, being symmetrical, permits the use of a minimum strength and therefore lightweight vehicle-booster attachment adapter, and imposes lower aerodynamic loads on the booster than the winged or asymmetric vehicles, reducing booster control problems. The lenticular shaped vehicle is amenable to simple pressure compartment design. Further, the lenticular vehicle, because of its circular planform and heat shield design, is, unlike the winged or asymmetric vehicles, inherently stable in both pitch and yaw at high angles of attack. Therefore, should the aerodynamic flaps fail to function due to some unforeseen casualty, a successful reentry and landing could be accomplished with only the use of a parachute and reaction jet controls.

A sealed compartment 15 for one or more occupants is formed within the vehicle 11. As shown schematically in FIG. 1, an attitude control unit 16 and a flap control unit 17 are provided within the compartment 15, each operable either automatically or manually by a vehicle occupant. A system of individually actuated reaction jets is provided on the vehicle for attitude stabilization of the vehicle above the Earth's atmosphere and directional control within the atmosphere. The system comprises diametrically spaced pairs of nozzle orifices positioned on the upper convex surface 12 of vehicle 11 as shown in FIG. 2. The pitch control jets 18, 19 are located on the fore and aft axis of the vehicle while the roll and yaw control jets 21, 22 and 23, 24, respectively, are positioned on the vehicle transverse axis. The jets are selectively actuated by the opening and closing of individual feed valves, not shown, connected between each jet and a reaction medium supply, not shown, preferably of the type utilizing a hydrogen peroxide fuel, as exemplified in Technical Note D-480 published in October 1960, by the National Aeronautics and Space Administration in Washington, D.C. The attitude control unit 16 may include a conventional gyro stabilization system, not shown, for automatic operation which transmits output signals to the above mentioned feed valves for actuation of the appropriate control jet. Gyro systems of the type described are generally known and available in the art and the system per se does not constitute a part of the present invention. A manual control system, not shown, operated by one of the occupants may be provided as a secondary means for selectively actuating the reaction jets 18, 19, 21, 22, 23, 24. It will be further noted that the reaction jets 18, 19, 21, 22 are positioned so as to direct the reaction medium upwardly, whereas jets 23, 24 expel the reaction medium in a rearward direction. It will likewise be apparent that only one of each pair of reaction jets is actuated at any one time so as to produce a correctional, rotational moment for stabilizing the vehicle.

Figure 3:
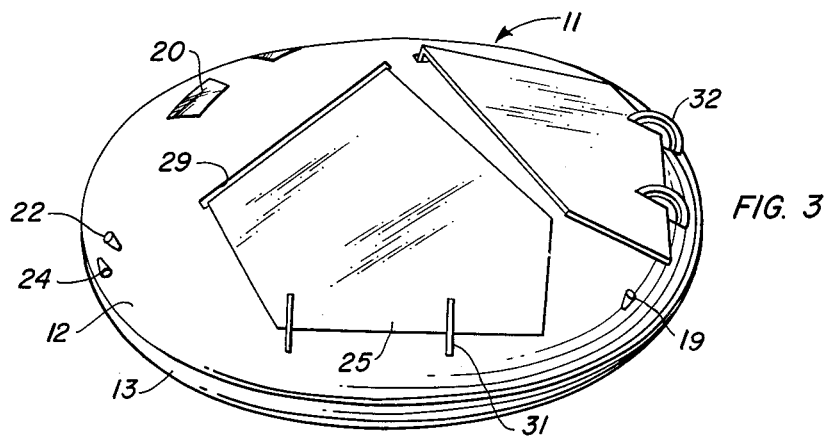
FIG. 3 is a perspective view of the space vehicle of FIG. 1 with the flaps in retracted position.

To provide the desired atmospheric maneuvering capability, aerodynamic control members or flaps 25, 26 are foldably or pivotally attached by hinge means 31, 32 to the after, upper convex surface of vehicle 11. The hinge means 31, 32, as best shown in FIG. 2, are oriented at an angle of approximately 45° to the fore and aft axis of the vehicle. The flaps 25, 26 are each formed with an end plate or fin 27 projecting normally to the flat, planar surface 28. In the upper convex surface 12 of the vehicle are provided two slots 29, 30 which extend essentially transverse to the fore and aft vehicle axis. A housing, not shown, projecting inwardly from upper convex surface 12 at a slight forward angle so as to receive and house the flap end plates 27 in vehicle compartment 15, when the flaps 25, 26 are in inoperative, folded or retracted position, may be provided. The flaps 25, 26 when folded are thereby enabled to form a substantially continuous extension of the convex vehicle surface 12, as best shown in FIG. 3.

Figures 4, 5:
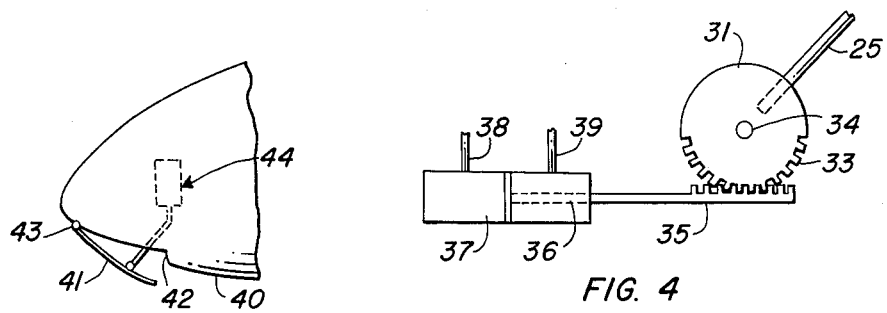
FIG. 4 is a somewhat schematic view of one form of flap actuating means.
FIG. 5 is a partial side view of an alternative embodiment of the vehicle of FIG. 1 incorporating an extendible nose ski.

One form of conventional actuating means for extending flaps 25, 26 into operative position and for retracting them into folded position is shown in FIG. 4. The actuating means for each flap are similar and therefor only one will be described. The fin 25 at one edge is secured to a pair of circular elements 31, each element being formed with a toothed, gear segment 33. The elements 31 in turn are fixed to an axle 34 which is rotatably mounted in brackets or otherwise, not shown, to vehicle surface 12. The geared elements 31 are individually driven by a rack 35 which is affixed to a piston rod 36, the rod being reciprocable in hydraulic cylinder 37. The piston rod 36 may be caused to move in either direction by hydraulic pressure introduced into cylinder 37 through pipes 38, 39 which are connected to a conventional hydraulic supply system, not shown, whereby the vehicle occupant may actuate cylinder 37 from the flap control unit 17, FIG. 1, and thus extend or retract the flap 25. Although a hydraulic actuating means has been shown, the actuating means may be hydraulic or electrical since servo mechanisms of any well-known type may be used in adjustably and controllably positioning flaps 25, 26.

In FIG. 5 is shown a partial side view of an alternative embodiment of the space vehicle above described, modified to provide glide type water landing capabilities. The modification consists of the provision of a extendible nose ski 41 to the vehicle lower convex heat shield surface 40. The surface 40 is formed with a recess 42 to receive the ski 41 when retracted. The ski 41 is pivotally attached to the vehicle nose at 43 and means for operating the ski are diagrammatically illustrated at 44. The specific means for operating the ski is not critical to the present invention and any conventional mechanism capable of performing this function may be utilized. One such mechanism capable of being used is disclosed in U.S. Patent 2,402,379. In operation, the ski 41 is maintained retracted in recess 42 until the occupant is ready to land the space vehicle on water. Then, the ski 41 is extended by means 44 to aid in stabilizing the vehicle during the landing operation.

Figure 6:
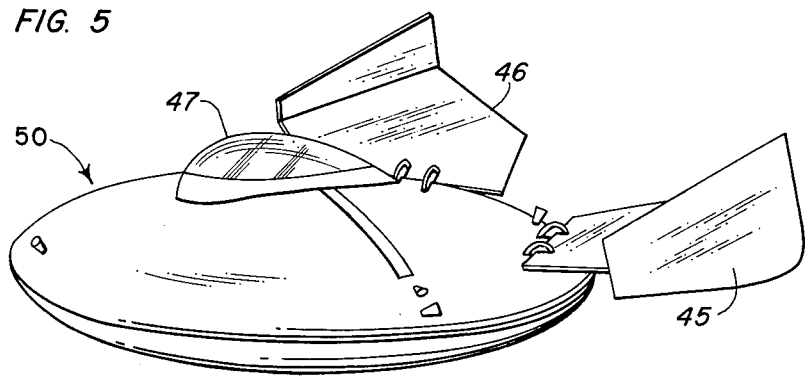
FIG. 6 is a perspective view of a further alternative embodiment of a space vehicle according to the present invention.

A further alternative embodiment of the space vehicle of the present invention is shown in FIG. 6. In this configuration, the end plates or lateral fins 45 projecting normally from the flat or horizontal flap surfaces 46 are modified from the end plates shown in the embodiment of FIG. 1. The end plates or fins 45 are designed to eliminate the need for using reaction jets in the atmosphere for lateral and directional stability. Trim tabs, not shown, or other movable control surfaces may be added to flap surfaces 45, 46 to provide additional control if desired. The space vehicle 50 of FIG. 6 is also provided with an astrodome 47 to increase the usable vehicle volume both for occupants and for additional equipment.

For the purpose of providing a better understanding of the space vehicle of the present invention the operational sequence as depicted in FIG. 7 will now be described. The vehicle 11 with flaps 25, 26 in folded inoperative position may be launched into orbit as the payload of a three stage booster rocket 51 as illustrated in FIG. 7a. Subsequent to ignition and lift off of rocket 51, the first stage motor 52, the low drag nose section 53, and the escape system fins 54 are jettisoned, as shown in FIG. 7b. The second and third stage motors 55, 56 are next separated and dropped, FIG. 7c, 7d, as vehicle 11 is injected into space. In FIG. 7e, the vehicle 11 trailed by vehicle-booster adapter 57 is shown reentering the Earth's atmosphere, the vehicle 11 at this time being trimmed to a high angle of attack to produce high drag and moderate lift by means of the reaction jets 18, 19, 21, 22, 23, 24, which have been operative throughout the space flight to attitude stabilize the vehicle 11. It will be noted that the lower convex heat shield surface 14 is positioned foremost for protection of the vehicle and its occupants from the heat generated upon reentry. At approximately 100,000 feet, subsequent to peak heating, and at a velocity of approximately Mach 2, the vehicle occupant through flap control unit 17 actuates the hydraulic cylinders 37 to pivot the flaps 25, 26 into extended, operative position, depicted in FIG. 7f. The occupant then maneuvers the space vehicle 11 to the desired touchdown location, either by using flaps 25, 26 for roll and pitch control in combination with directional jets 23, 24, or, in the embodiment of FIG. 6, by utilizing flaps 45, 46 alone, as illustrated at 7g. The vehicle 11 then goes into its glide path, FIG. 7h, and is flared to essentially zero sinking velocity as at FIG. 7i. A horizontal landing is then made, FIG. 7j, with the curved lower heat shield surface 14 serving as a skid-rocker to convert the vehicle sinking-speed energy into angular energy, through rocking oscillation of the vehicle on its lower convex surface, the energy thus being dissipated by friction and aerodynamic damping. If desired, a drogue chute 58 may be ejected from the vehicle upon touchdown to stabilize the vehicle in the edgewise direction.

As a result of this invention, it is evident that a space vehicle may be provided which combines the lightweight structure-high usable volume of the lenticular configuration with the high maneuvering capabilities at supersonic and subsonic speeds of the winged vehicle and eliminates the need for heavy, complicated landing gear systems.

Obviously many modifications and variations of the present invention are possible in the light of the above teachings. It is therefore to be understood that within the scope of the appended claims the invention may be practiced otherwise than as specifically described.

What is claimed as new and desired to be secured by Letters Patent of the United States is:

1. A space vehicle capable of atmospheric maneuvering comprising in combination a lenticular body having an upper convex surface, aerodynamic control flaps pivotally connected to said convex surface, means positioned in said body for pivotally moving said flaps from an inoperative, folded position to an operative, extended position, said body having a lower convex surface, said lower convex surface comprising a heat shield for said body, and individually actuated reaction jets positioned on said upper convex surface for stabilizing said lenticular body in roll, pitch and yaw.

2. A space vehicle as defined in claim 1, and including slot means formed in said upper convex surface, each of said flaps comprising a flat surface and an end plate projecting normally therefrom, said flap end plate being received in said slot means when said flaps are pivoted to said inoperative, folded position.

3. A space vehicle as defined in claim 1, and including a ski pivotally connected to the bow of said body, said lower convex surface having a recess adapted to receive said ski, and means positioned in said body for extending said ski to an operative position and for retracting said ski into said recess.

4. A space vehicle capable of atmospheric maneuvering comprising in combination a lenticular body having an upper convex surface, slot means formed in said convex surface, aerodynamic control flaps pivotally connected to said convex surface, each of said flaps comprising a flat surface and an end plate projecting normally therefrom, and means located in said body for pivotally moving said flaps from an inoperative folded position wherein said flap end plate is received in said slot means, said flaps thereby forming a substantially continuous extension of the upper convex surface, to an operative, extended position.

5. A space vehicle as defined in claim 4, wherein said slot means extend essentially transverse to the fore and aft axis of said body.

6. A space vehicle as defined in claim 5, wherein said slot means includes a pair of slots, one positioned on either side of the fore and aft axis of said body, and said flaps include a pair of flaps, one flap pivotally connected to said upper convex surface on either side of the fore and aft axis of said body.

7. A space vehicle as defined in claim 4, and wherein said lenticular body has a lower convex surface, said lower convex surface comprising a heat shield for said body.

8. A space vehicle as defined in claim 7, and including a ski pivotally connected to the bow of said body, said lower convex surface having a recess adapted to receive said ski, and means positioned in said body for extending said ski to an operative position and for retracting said ski into said recess.

9. A space vehicle capable of atmospheric maneuvering comprising in combination a lenticular body having an upper convex surface and a lower convex surface, aerodynamic control members pivotally connected to said upper convex surface, means located in said body for pivotally moving said members from an inoperative, retracted position to an operative, extended position, and said lower convex surface comprising a heat shield for said body.

10. The space vehicle as defined in claim 9, and including a ski pivotally connected to the bow of said body, said lower convex surface having a recess adapted to receive said ski, and means positioned in said body for extending said ski to an operative position and for retracting said ski into said recess.

11. A space vehicle capable of atmospheric maneuvering comprising in combination a lenticular body having an upper convex surface, aerodynamic control members pivotally attached to said upper convex surface, means located in said body for pivotally moving said members from an inoperative, retracted position to an operative, extended position, and individually actuated reaction jets positioned on said upper convex surface for stabilizing said lenticular body in roll, pitch and yaw.

12. A space vehicle as defined in claim 11, and including slot means formed in said upper convex surface, each of said members comprising a flat surface and an end plate projecting normally therefrom, said end plate being received in said slot means when said members are pivoted to said inoperative, retracted position, said members thereby forming a substantially continuous extension of said upper convex surface.

13. A space vehicle capable of atmospheric maneuvering comprising a lenticular body having an upper convex surface, aerodynamic control flaps pivotally connected to said convex surface, each of said flaps comprising a flat surface and an end plate projecting normally therefrom, means for pivotally moving said flaps from an inoperative, folded position to an operative, extended position, the lower portion of said flap end plate in said extended position being formed with a curvilinear edge, said body having a lower convex surface, said lower convex surface comprising a heat shield for said body, and individually actuated reaction jets positioned on said upper convex surface for stabilizing said lenticular body in roll, pitch and yaw.

14. The space vehicle as defined in claim 13, and including an astrodome positioned on said upper convex surface.

References Cited in the file of this patent

Aviation Week Magazine of July 11, 1960, page 67.